US012662975B2

(12) United States Patent
Leufven et al.

(10) Patent No.: US 12,662,975 B2
(45) Date of Patent: Jun. 23, 2026

(54) METHOD OF CONTROLLING INTERNAL COMBUSTION ENGINE, CONTROL ARRANGEMENT, INTERNAL COMBUSTION ENGINE, AND VEHICLE

(71) Applicant: Scania CV AB, Södertälje (SE)

(72) Inventors: Oskar Leufven, Södertälje (SE); Erik Höckerdal, Södertälje (SE); Andreas Dahl, Nyköping (SE); Håkan Sarby, Huddinge (SE); Henrik Westerfelt, Hägersten (SE); Henrik Skog, Huddinge (SE); Michael Vallinder, Mölnbo (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/709,171

(22) PCT Filed: Nov. 11, 2022

(86) PCT No.: PCT/SE2022/051058
§ 371 (c)(1),
(2) Date: May 10, 2024

(87) PCT Pub. No.: WO2023/091063
PCT Pub. Date: May 25, 2023

(65) Prior Publication Data

US 2024/0426256 A1 Dec. 26, 2024

(30) Foreign Application Priority Data

Nov. 18, 2021 (EP) ..................................... 21209040

(51) Int. Cl.
*F02D 41/40* (2006.01)
*F02D 41/00* (2006.01)

(52) U.S. Cl.
CPC ....... *F02D 41/403* (2013.01); *F02D 41/0085* (2013.01); *F02D 41/405* (2013.01); *F02D 2250/36* (2013.01); *F02D 2250/38* (2013.01)

(58) Field of Classification Search
CPC .. F02D 41/403; F02D 41/0085; F02D 41/405; F02D 2250/36; F02D 2250/38
See application file for complete search history.

(56) References Cited

U.S. PATENT DOCUMENTS 6,142,121 A * 11/2000 Nishimura ......... F02M 63/0225 123/456
6,314,952 B1 * 11/2001 Turin .................. F02D 41/1401 123/674

(Continued)

FOREIGN PATENT DOCUMENTS

DE 102006000973 A1 7/2007
EP 1211402 B1 5/2007

(Continued)

OTHER PUBLICATIONS

Scania CV AB, International Patent Application No. PCT/SE2022/051058, International Search Report, Feb. 6, 2023.

(Continued)

*Primary Examiner* — Joseph J Dallo
(74) *Attorney, Agent, or Firm* — Moore & Van Allen PLLC; W. Kevin Ransom

(57) ABSTRACT

A method of controlling an internal combustion engine is disclosed, the internal combustion engine comprising at least two cylinders, wherein each cylinder comprises at least one fuel injector configured to inject fuel into the cylinder, wherein the method comprises controlling the fuel injection performed by the fuel injectors into the cylinders based on an estimate of a residual gas imbalance between the at least two cylinders. The present disclosure further relates to a (Continued)

computer program product, a control arrangement, an internal combustion engine, and a vehicle.

16 Claims, 4 Drawing Sheets

(56) References Cited

U.S. PATENT DOCUMENTS

| | | | | |
|---|---|---|---|---|
| 10,208,686 | B1 | 2/2019 | Thomas et al. | |
| 2009/0077965 | A1* | 3/2009 | Pursifull | F02D 41/221 60/602 |
| 2013/0245921 | A1 | 9/2013 | Glugla et al. | |
| 2014/0157983 | A1* | 6/2014 | Trump | B01D 19/0021 96/6 |
| 2015/0136097 | A1* | 5/2015 | Hoshi | F02D 41/0025 123/575 |
| 2016/0102636 | A1* | 4/2016 | Styles | F02M 26/02 123/568.21 |
| 2016/0169134 | A1 | 6/2016 | Dring | |
| 2017/0138317 | A1* | 5/2017 | Gokhale | F02D 23/02 |
| 2017/0167424 | A1* | 6/2017 | Glugla | F02D 41/3005 |
| 2019/0032585 | A1* | 1/2019 | Kelly | F01N 3/10 |
| 2019/0170108 | A1* | 6/2019 | Yoshikawa | F02D 41/1498 |
| 2019/0186396 | A1 | 6/2019 | Sueoka et al. | |
| 2020/0318555 | A1* | 10/2020 | Sueoka | F02M 35/112 |

FOREIGN PATENT DOCUMENTS

| | | | | |
|---|---|---|---|---|
| EP | 2921682 | A1 * | 9/2015 | F01N 3/208 |
| EP | 3719291 | A1 | 10/2020 | |
| EP | 4183997 | A1 * | 5/2023 | F02D 13/0265 |
| JP | 2013148057 | A | 8/2013 | |
| KR | 2020053374 | A * | 5/2020 | F16K 1/34 |
| WO | WO-9919277 | A1 * | 4/1999 | C01B 13/0207 |
| WO | WO-2010087029 | A1 * | 8/2010 | F02D 41/1454 |
| WO | WO-2012077164 | A1 * | 6/2012 | F02B 37/18 |
| WO | WO-2022034147 | A1 * | 2/2022 | B01J 19/245 |
| WO | WO-2023091063 | A1 * | 5/2023 | F02D 13/0265 |

OTHER PUBLICATIONS

Scania CV AB, International Patent Application No. PCT/SE2022/051058, Written Opinion, Feb. 6, 2023.

Scania CV AB, European Patent Application No. 21209040.1, Extended European Search Report, May 11, 2022.

* cited by examiner

METHOD OF CONTROLLING INTERNAL COMBUSTION ENGINE, CONTROL ARRANGEMENT, INTERNAL COMBUSTION ENGINE, AND VEHICLE

CROSS-REFERENCE TO RELATED APPLICATIONS

This application is a National Stage Patent Application (filed under 35 § U.S.C. 371) of PCT/SE2022/051058, filed Nov. 11, 2022, of the same title, which, in turn claims priority to European Patent Application No. 21209040.1 filed Nov. 18, 2021, of the same title; the contents of each of which are hereby incorporated by reference.

TECHNICAL FIELD

The present disclosure relates to a method of controlling an internal combustion engine. The present disclosure further relates to a computer program, a computer-readable medium, a control arrangement, an internal combustion engine, and a vehicle.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning a crankshaft. A stroke refers to the full travel of the piston along the cylinder, in either direction. The uppermost position of the piston in the cylinder is usually referred to as the top dead center TDC, and the lowermost position of the piston in the cylinder is usually referred to as the bottom dead center BDC.

The strokes are completed in the following order, inlet stroke, compression stroke, expansion stroke and exhaust stroke. During operation of a conventional four-stroke internal combustion engine, the inlet valve control arrangement controls inlet valves of a cylinder to an open state during the inlet stroke of a piston within the cylinder, to allow air, or a mixture of air and fuel, to enter the cylinder. During the compression stroke, all valves should be closed to allow compression of the air, or the mixture of the air and fuel, in the cylinder. If the engine is in a power producing state, fuel in the cylinder is ignited, usually towards the end of the compression stroke, for example by a spark plug or by compression heat in the cylinder. The combustion of fuel within the cylinder significantly increases pressure and temperature in the cylinder. The combustion of the fuel usually continues into a significant portion of the subsequent expansion stroke. The increased pressure and temperature in the cylinder obtained by the combustion is partially converted into mechanical work supplied to the crank shaft during the expansion stroke. Obviously, all valves should remain closed during the expansion stroke to allow the increased pressure and temperature to be converted into mechanical work. The expansion stroke is also usually referred to as the combustion stroke, since usually, most of the combustion takes place during the expansion stroke. In the subsequent exhaust stroke, the exhaust valve control arrangement controls exhaust valves of the cylinder to an open state to allow exhaust gases to be expelled out of the cylinder into an exhaust system of the combustion engine.

The exhaust stroke and the inlet stroke can collectively be referred to as a gas exchanging phase of a cylinder because gas is normally transferred out from and into the cylinder in these strokes. As understood from the above, typically, gas is not allowed to flow into or out from the cylinder during the subsequent compression stroke and the expansion stroke of the cylinder.

General problems when designing an internal combustion engine is the emission levels from the engine and the fuel consumption of the engine. The emission levels of carbon dioxide $CO_2$ are directly correlated to the fuel consumption of the engine. Moreover, exhausts from an engine can comprise carbon monoxide CO from incomplete combustion, hydrocarbons HC from unburnt fuel, nitrogen oxides NOx from high combustion temperatures, and particulate matter which is usually abbreviated PM and consists mostly of soot/smoke.

Due to environmental concerns, almost all vehicles for sale today comprise some kind of exhaust after treatment system. Examples are catalytic converters, particulate filters, and Selective catalytic reduction (SCR) arrangements. A selective catalytic reduction arrangement is a means of converting nitrogen oxides NOx with the aid of a catalyst into diatomic nitrogen N2, and water H2O. A gaseous reductant, typically anhydrous ammonia, aqueous ammonia, or urea is added to a stream of exhaust gas and is adsorbed onto a catalyst. Function of these exhaust after treatment systems rely on the high temperature of the exhaust gases.

An engine is typically operated to minimize the temperature of the exhaust gas, since there is a correlation between engine efficiency and remaining gas temperature after the gas has left the cylinder system. That is, ideally, the engine should have a fast combustion event close to the top dead center TDC, followed by a relatively long expansion of the gas in the expansion stroke to get as much engine brake torque per fuel amount. This gives a fuel-efficient engine with a low exhaust gas temperature.

Nitrogen oxides NOx are formed by a reaction between oxygen O2 and nitrogen N upon high temperatures and pressures in a cylinder of an engine. In other words, when the operation of the engine is optimized regarding fuel efficiently, large amounts of nitrogen oxides NOx may be formed. Exhaust gas recirculation (EGR) is an effective strategy to control the NOx emissions from engines. EGR works by recirculating a portion of an engine's exhaust gas back to the engine cylinders. The EGR reduces the formation of NOx through lowering the oxygen concentration in the combustion chamber, as well as through heat absorption, which reduces peak in-cylinder temperatures.

Several types of exhaust gas recirculation systems exit, including external recirculation systems comprising duct arrangements arranged to transfer a portion of an engine's exhaust gas back to an inlet manifold of the engine, as well internal systems in which a portion of the engine's exhaust gas is kept in, or recirculated in and out of, a cylinder of an engine by engine valve control. Moreover, also during normal operation, the cylinders comprise some residual gas from previous combustion cycles because of non-complete gas exchanges in the gas exchanging phases of the cylinders.

Furthermore, in some operational conditions, exhaust gas may flow between cylinders of an engine in the gas exchanging phases of the cylinders.

The term residual gas in a cylinder may in this context be defined as exhaust gas from a previous combustion cycle of the engine. The residual gas may thus derive from the current cylinder or another cylinder of the engine. Moreover, the residual gas may have entered the cylinder via an internal or external exhaust gas recirculation EGR system, may have entered the cylinder as a result of the engine valve control, or may simply occupy in the cylinder as a result of a non-complete gas exchange in a previous gas exchanging phase of the cylinder.

A high amount of residual gas in a cylinder reduces the formation of nitrogen oxides NOx but increases the formation of soot. Correspondingly, a low amount of residual gas in a cylinder decreases the formation of soot but increases the formation of nitrogen oxides NOx.

Problems may arise in the converting efficiency of an exhaust after treatment system if the engine is operated to generate a low exhaust temperature, especially during cold starts, low engine load conditions, prolonged periods of engine idling, and the like. Therefore, at certain times and/or conditions, it can be desired to operate the engine to increase the exhaust temperature even if it has a negative impact on the fuel consumption of the engine. A further example of when it can be desired to increase the exhaust temperature is when it is wanted to increase the available turbine exhaust gas energy in an engine comprising a turbocharger.

Moreover, current emission legislations lead to a necessity to get the exhaust gas aftertreatment system to a high efficiency fast, and always keep it there, i.e., heat it up fast with low engine out emissions, especially of nitrogen oxides NOx. This will be even more important in upcoming emission legislations. Current solutions to solve the emission challenge could be late injections, combined with having parts of the aftertreatment system close to the exhaust valves to reduce thermal inertia and exhaust gas heat losses. However, for upcoming emission legislations, such solutions may not be sufficient.

SUMMARY

It is an object of the present invention to overcome, or at least alleviate, at least some of the above-mentioned problems and drawbacks.

According to a first aspect of the invention, the object is achieved by a method of controlling an internal combustion engine, the internal combustion engine comprising at least two cylinders, wherein each cylinder comprises at least one fuel injector configured to inject fuel into the cylinder, and wherein the method comprises the step of:

- controlling the fuel injection performed by the fuel injectors into the cylinders based on an estimate of a residual gas imbalance between the at least two cylinders.

Since the method comprises the step of controlling the fuel injection performed by the fuel injectors into the cylinders based on the estimate of the residual gas imbalance, a method is provided capable of reducing the negative effects of residual gas imbalances between the cylinders of the engine in an efficient manner. That is, a method is provided having conditions for compensating differences in the combustion properties between the cylinders of the engine caused by residual gas imbalances between the cylinders. A consequence of a residual gas imbalance is that a cylinder with more residual gas and less air will produce less NOx while being prone to produce more soot. Likewise, a cylinder with less residual gas and more air will produce less soot but being prone to produce more NOx.

Accordingly, a method is provided capable of controlling the injection of fuel into each cylinder to minimize the formation of nitrogen oxides NOx and soot so as to minimize the total emission levels of these substances from the engine.

Moreover, the inventors of the present invention have discovered that some control strategies of the engine can be used to increase the exhaust temperature in an efficient manner, but these control strategies may have a negative impact on the residual gas imbalances between the cylinders of the engine. However, since the method comprises the step of controlling the fuel injection performed by the fuel injectors into the cylinders based on the estimate of the residual gas imbalance, a method is provided capable of reducing the negative effects of engine control strategies causing higher residual gas imbalances between the cylinders of the engine.

Thus, a method is provided allowing control strategies to be used which can increase the exhaust temperature in an efficient manner while keeping the formation of nitrogen oxides NOx and soot at low levels by controlling the fuel injection based on the estimate of the residual gas imbalance.

Accordingly, a method is provided overcoming, or at least alleviating, at least some of the above-mentioned problems and drawbacks. As a result, the above-mentioned object is achieved.

Optionally, each cylinder comprises at least one exhaust valve, and wherein the method comprises the step of:

- advancing control of the exhaust valves of the internal combustion engine.

Since the method comprises the step of advancing control of the exhaust valves of the internal combustion engine, a method is provided capable of increasing the exhaust temperature. This is because the advancement of the control causes the exhaust valves to open and close earlier than before the advancement of the control. An early exhaust valve opening can interrupt the expansion resulting in less flywheel torque and hotter exhaust gases. An early exhaust valve closing can result in trapping significantly more hot residuals that can be recompressed in the cylinder, which potentially increases the pumping work.

Moreover, when an inlet valve of the respective cylinder opens, it can punctuate the cylinder and expelling the trapped residuals into an intake manifold of the engine. This can increase the pumping work of the engine since the work used to compress the trapped exhaust gases is not expanded to produce positive work. The exhaust gases expelled into the intake manifold might result in a higher residual gas imbalance, i.e., an imbalance of residuals among the cylinders.

However, since the method comprises the step of controlling the fuel injection performed by the fuel injectors into the cylinders based on the estimate of the residual gas imbalance, a method is provided capable of reducing the negative effects of the higher residual gas imbalance caused by this engine control strategy. Thus, a method is provided capable of increasing the exhaust temperature in an efficient manner while keeping the formation of nitrogen oxides NOx and soot at low levels.

Optionally, each cylinder comprises at least one inlet valve, and wherein the method comprises the step of:

- controlling the amount of air pumped through the engine by phase shifting control of the inlet valves of the internal combustion engine.

Thereby, a method is provided capable of regulating the exhaust temperature in an efficient manner while keeping the formation of nitrogen oxides NOx and soot at low levels. Moreover, by phase shifting control of the inlet valves, the opening timing, and the closing timing of the inlet valve/valves of the respective cylinder can be controlled. In this manner, a method is provided capable of controlling the geometric compression ratio as well as the residual gas imbalance between the cylinders. That is, a late intake valve opening result in a more homogenous gas composition over the cylinders, i.e., less residual gas imbalance between the cylinders. In this manner, the injection strategies can be further optimized with respect to NOx and smoke. Furthermore, conditions are provided for using the method also higher up in engine load.

Moreover, an early intake valve opening can punctuate the cylinder and expelling the trapped residuals into an intake manifold of the engine. This can increase the pumping work of the engine since the work used to compress the trapped exhaust gases is not expanded to produce positive work. The exhaust gases expelled into the intake manifold might result in a higher residual gas imbalance, i.e., an imbalance of residuals among the cylinders. However, as above, since the method comprises the step of controlling the fuel injection performed by the fuel injectors into the cylinders based on the estimate of the residual gas imbalance, a method is provided capable of reducing the negative effects of the higher residual gas imbalance caused by this engine control strategy.

Optionally, the phase shifting of the control of the at least one inlet valve comprises the step of:

retarding control of the inlet valves of the internal combustion engine.

Thereby, the opening timing and the closing timing of the inlet valve/valves of the respective cylinder are retarded, i.e., delayed. In this manner, a reduced residual gas imbalance is provided between the cylinders. Moreover, as explained, the injection strategies can be further optimized with respect to NOx and smoke. Moreover, conditions are provided for using the method also higher up in engine load.

Optionally, the step of controlling the fuel injection performed by the fuel injectors comprises the step of:

performing an individual control of the fuel injection performed by each fuel injector into the cylinders based on the estimate.

Thereby, a method is provided capable of further reducing the negative effects of residual gas imbalances between the cylinders of the engine. Moreover, a method is provided having improved conditions for reducing the negative effects of engine control strategies causing higher residual gas imbalances between the cylinders of the engine. Thus, a method is provided allowing efficient control strategies to be used which can increase the exhaust temperature while keeping the formation of nitrogen oxides NOx and soot at low levels by performing the individual control of the fuel injection based on the estimate of the residual gas imbalance.

Optionally, the step of controlling the fuel injection performed by the fuel injectors comprises the step of:

controlling at least one of a fuel injection amount and a fuel injection timing.

Thereby, a method is provided capable of reducing the negative effects of residual gas imbalances between the cylinders of the engine in a simple and efficient manner thereby allowing the engine to operate in operational modes causing higher imbalances of the residual gas between the cylinders.

Optionally, the step of controlling the fuel injection performed by the fuel injectors comprises the step of:

reducing the fuel injection amount of a fuel injector if the estimate indicates a high amount of residual gas in the cylinder comprising the fuel injector.

Normally, a high amount of residual gas in a cylinder increases the formation of soot and reduces the formation of nitrogen oxides NOx. However, since the method comprises the step of reducing the fuel injection amount of a fuel injector if the estimate indicates a high amount of residual gas in the cylinder, a method is provided capable of restoring the balance between soot formation and NOx formation in the cylinder in a simple and efficient manner. This is because a reduction in the fuel injection amount tends to reduce the formation of soot and increase the formation of nitrogen oxides NOx in the cylinder. Thus, a method is provided capable of levelling out the formation of soot and nitrogen oxides NOx among the cylinders of the engine in a simple and efficient manner which can reduce the total emission levels of the engine.

Optionally, the step of controlling the fuel injection performed by the fuel injectors comprises the step of:

increasing the fuel injection amount of a fuel injector if the estimate indicates a low amount of residual gas in the cylinder comprising the fuel injector.

Normally, a low amount of residual gas in a cylinder decreases the formation of soot and increases the formation of nitrogen oxides NOx. However, since the method comprises the step of increasing the fuel injection amount of a fuel injector if the estimate indicates a low amount of residual gas in the cylinder, a method is provided capable of restoring the balance between soot formation and NOx formation in the cylinder in a simple and efficient manner. This is because an increase in the fuel injection amount tends to increase the formation of soot and reduce the formation of nitrogen oxides NOx in the cylinder. Thus, a method is provided capable of levelling out the formation of soot and nitrogen oxides NOx among the cylinders of the engine in a simple and efficient manner which can reduce the total emission levels of the engine.

Optionally, the step of controlling the fuel injection performed by the fuel injectors comprises the step of:

advancing the fuel injection timing of a fuel injector if the estimate indicates a high amount of residual gas in the cylinder comprising the fuel injector.

As mentioned, a high amount of residual gas in a cylinder normally increases the formation of soot and reduces the formation of nitrogen oxides NOx in the cylinder. However, since the method comprises the step of advancing the fuel injection timing of a fuel injector if the estimate indicates a high amount of residual gas in the cylinder, a method is provided capable of restoring the balance between soot formation and NOx formation in the cylinder in a simple and efficient manner. This is because an advancement of the fuel injection timing tends to reduce the formation of soot and increase the formation of nitrogen oxides NOx in the cylinder. Thus, a method is provided capable of levelling out the formation of soot and nitrogen oxides NOx among the cylinders of the engine in a simple and efficient manner which can reduce the total emission levels of the engine.

Optionally, the step of controlling the fuel injection performed by the fuel injectors comprises the step of:

retarding the fuel injection timing of a fuel injector if the estimate indicates a low amount of residual gas in the cylinder comprising the fuel injector.

As mentioned, a low amount of residual gas in a cylinder normally reduces the formation of soot and increases the formation of nitrogen oxides NOx in the cylinder. However, since the method comprises the step of retarding the fuel injection timing of a fuel injector if the estimate indicates a low amount of residual gas in the cylinder, a method is provided capable of restoring the balance between soot formation and NOx formation in the cylinder in a simple and efficient manner. This is because a retardation of the fuel injection timing tends to increase the formation of soot and reduce the formation of nitrogen oxides NOx in the cylinder. Thus, a method is provided capable of levelling out the formation of soot and nitrogen oxides NOx among the cylinders of the engine in a simple and efficient manner which can reduce the total emission levels of the engine.

Optionally, the step of controlling the fuel injection performed by the fuel injectors comprises the step of:

controlling the fuel injectors to perform a pilot injection, a main injection, and a post injection.

Thereby, a method is provided capable of ensuring a steady and controlled combustion in the cylinders of the engine while providing conditions for further increased exhaust temperatures of the engine. This is because the pilot injection can ensure combustion and create prerequisites for a main combustion event at the main injection, whereas the post injection of fuel can produce more heat to the exhausts which increases the exhaust temperature.

Optionally, the step of controlling the fuel injection performed by the fuel injectors comprises the step of:

controlling at least one of a fuel injection amount and a fuel injection timing of the main injection.

Thereby, a method is provided capable of reducing the negative effects of residual gas imbalances between the cylinders of the engine in an effective manner thereby allowing the engine to operate in operational modes causing higher imbalances of the residual gas between the cylinders.

Optionally, each cylinder comprises at least one exhaust valve, and wherein the method comprises the step of:

phase shifting control of the exhaust valves of the internal combustion engine, and controlling the fuel injection timing of the fuel injectors based on a current phase shift of the control of the exhaust valves.

Thereby, a conjoint control of the fuel injection timing and the current phase shift of the control of the exhaust valves is provided. As a result, a method is provided capable of controlling and increasing the exhaust temperature while ensuring a stable and efficient combustion in the cylinders of the engine.

Optionally, the method comprises the step of:

providing the estimate of a residual gas imbalance between the at least two cylinders.

Optionally, the step of providing the estimate of the residual gas imbalance between the at least two cylinders comprises the steps of:

obtaining temperature data representative of a temperature at a respective air inlet of the at least two cylinders, and providing the estimate based on the temperature data.

Thereby, accurate and reliable estimates of the residual gas imbalance can be provided which provides conditions for a further efficient method for reducing the negative effects of residual gas imbalances between the cylinders of the engine.

Optionally, the step of providing the estimate of the residual gas imbalance between the at least two cylinders comprises the steps of:

obtaining engine operation data representative of one or more of an engine speed, an engine load, and a current phase shift of the control of exhaust valves and/or inlet valves of the internal combustion engine, and providing the estimate based on the engine operation data.

Thereby, accurate and reliable estimates of the residual gas imbalance can be provided in a cost-efficient manner which provides conditions for a further efficient method for reducing the negative effects of residual gas imbalances between the cylinders of the engine.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments, a computer program is provided which provides conditions for overcoming, or at least alleviating, at least some of the above-mentioned drawbacks. As a result, the above-mentioned object is achieved.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments, a computer-readable medium is provided which provides conditions for overcoming, or at least alleviating, at least some of the above-mentioned drawbacks. As a result, the above-mentioned object is achieved.

According to a fourth aspect of the invention, the object is achieved by a control arrangement for an internal combustion engine, the internal combustion engine comprising at least two cylinders, wherein each cylinder comprises at least one fuel injector configured to inject fuel into the cylinder, and wherein the control arrangement is configured to:

control the fuel injection performed by the fuel injectors based on an estimate of an imbalance between residual gas in the at least two cylinders.

Since the control arrangement is configured to control the fuel injection performed by the fuel injectors into the cylinders based on the estimate of the residual gas imbalance, a control arrangement is provided capable of reducing the negative effects of residual gas imbalances between the cylinders of the engine in an efficient manner. That is, a control arrangement is provided having conditions for compensating differences in the combustion properties between the cylinders of the engine caused by residual gas imbalances between the cylinders. A consequence of a residual gas imbalance is that a cylinder with more residual gas and less air will produce less NOx while being prone to produce more soot. Likewise, a cylinder with less residual gas and more air will produce less soot but being prone to produce more NOx.

Accordingly, a control arrangement is provided capable of controlling the injection of fuel into each cylinder to minimize the formation of nitrogen oxides NOx and soot so as to minimize the total emission levels of these substances from the engine.

Furthermore, since the control arrangement is configured to control the fuel injection performed by the fuel injectors into the cylinders based on the estimate of the residual gas imbalance, a control arrangement is provided capable of reducing the negative effects of engine control strategies causing higher residual gas imbalances between the cylinders of the engine.

Thus, a control arrangement is provided allowing control strategies to be used which can increase the exhaust temperature in an efficient manner while keeping the formation of nitrogen oxides NOx and soot at low levels by controlling the fuel injection based on the estimate of the residual gas imbalance.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

According to a fifth aspect of the invention, the object is achieved by an internal combustion engine comprising at least two cylinders, wherein each cylinder at least one fuel injector configured to inject fuel into the cylinder, and wherein the internal combustion engine comprises a control arrangement according to some embodiments of the present disclosure.

Since the internal combustion engine comprises a control arrangement according to some embodiments, an internal combustion engine is provided comprising a control arrangement capable of reducing the negative effects of residual gas imbalances between the cylinders of the engine in an efficient manner.

Accordingly, an internal combustion engine is provided comprising a control arrangement capable of controlling the injection of fuel into each cylinder to minimize the formation of nitrogen oxides NOx and soot so as to minimize the total emission levels of these substances from the engine.

Furthermore, since the control arrangement is configured to control the fuel injection performed by the fuel injectors into the cylinders based on the estimate of the residual gas imbalance, the internal combustion engine is allowed to operate with engine control strategies causing higher residual gas imbalances between the cylinders of the engine. In other words, the control arrangement of the internal combustion engine allows control strategies to be used which can increase the exhaust temperature in an efficient manner while keeping the formation of nitrogen oxides NOx and soot at low levels by controlling the fuel injection based on the estimate of the residual gas imbalance.

Accordingly, an internal combustion engine is provided overcoming, or at least alleviating, at least some of the above-mentioned problems and drawbacks. As a result, the above-mentioned object is achieved.

Optionally, the internal combustion engine is a compression ignition engine, such as a diesel engine. Thereby, a compression ignition engine is provided having the above-mentioned advantages.

According to a sixth aspect of the invention, the object is achieved by a vehicle comprising an internal combustion engine according to some embodiments of the present disclosure.

Since the vehicle comprises an internal combustion engine according to some embodiments, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
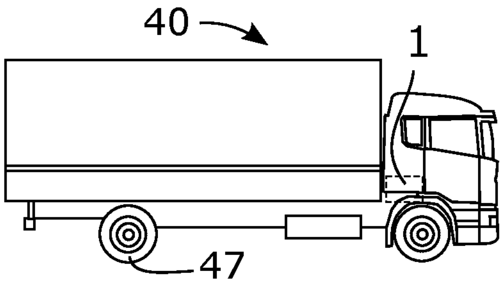
FIG. 1 illustrates a vehicle according to some embodiments of the present disclosure, FIG. 2 schematically illustrates an internal combustion engine of the vehicle illustrated in FIG. 1, FIG. 3 schematically illustrates an inlet manifold of the internal combustion engine illustrated in FIG. 2.

FIG. 1 illustrates a vehicle 40 according to some embodiments of the present disclosure. According to the illustrated embodiments, the vehicle 40 is a truck, i.e. a type of heavy vehicle. According to further embodiments, the vehicle 40, as referred to herein, may be another type of heavy or lighter type of manned or unmanned vehicle for land- or water-based propulsion, such as a lorry, a bus, a construction vehicle, a tractor, a car, a boat, a ship, or the like.

The vehicle 40 comprises an internal combustion engine 1. According to the illustrated embodiments, the internal combustion engine 1 is configured to provide motive power to the vehicle 40 via wheels 47 of the vehicle 40. The vehicle 40 may comprise one or more electric propulsion motors in addition to the internal combustion engine 1 for providing motive power to the vehicle 40. Thus, the vehicle 40 may comprise a so-called hybrid electric powertrain comprising one or more electric propulsion motors in addition to the internal combustion engine 1 for providing motive power to the vehicle 40.

Figure 2:
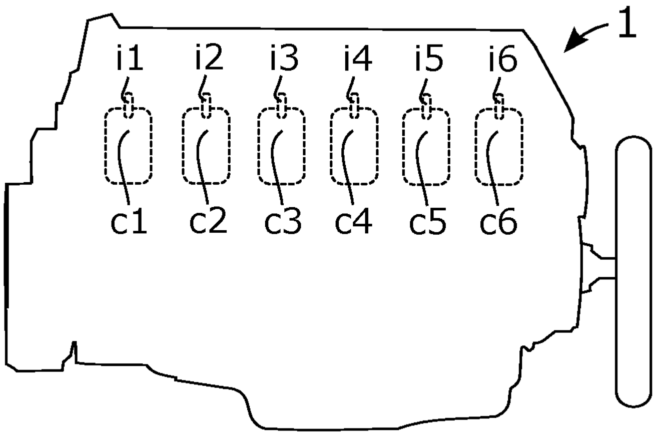

FIG. 2 schematically illustrates the internal combustion engine 1 of the vehicle 40 illustrated in FIG. 1. The internal combustion engine 1 comprises at least two cylinders c1, c2, c3, c4, c5, c6. In FIG. 2, the cylinders c1, c2, c3, c4, c5, c6 of the internal combustion engine 1 are schematically indicated. The reference sign for the cylinders c1, c2, c3, c4, c5, c6 of the combustion engine 1 is in some places herein abbreviated "c1-c6" for reasons of brevity and clarity.

According to the illustrated embodiments, the internal combustion engine 1 comprises six cylinders c1-c6 arranged in one row. The internal combustion engine 1 according to the illustrated embodiments may therefore be referred to an inline-six engine. However, according to further embodiments, the internal combustion engine 1, as referred to herein, may comprise another number of cylinders c1-c6 higher than one. Moreover, the cylinders c1-c6 of the internal combustion engine 1 may be arranged in another configuration than in one row, such as in two or more rows.

Each cylinder c1-c6 of the internal combustion engine 1 comprises at least one fuel injector i1, i2, i3, i4, i5, i6 configured to inject fuel into the cylinder c1-c6. The reference sign for the fuel injectors i1, i2, i3, i4, i5, i6 of the combustion engine 1 is in some places herein abbreviated "i1-i6" for reasons of brevity and clarity. According to the illustrated embodiments, the engine 1 comprises one fuel injector i1-i6 per cylinder c1-c6 wherein each fuel injector i1-i6 is configured to inject fuel directly into a cylinder c1-c6 of the internal combustion engine 1. According to further embodiments, the internal combustion engine 1 may comprise another number of fuel injectors i1-i6 per cylinder c1-c6.

According to the illustrated embodiments, the internal combustion engine 1 is a diesel engine, i.e. a type of compression ignition engine. The internal combustion engine 1 may thus be configured to operate on diesel or a diesel-like fuel, such as biodiesel, biomass to liquid (BTL), or gas to liquid (GTL) diesel. Diesel-like fuels, such as biodiesel, can be obtained from renewable sources such as vegetable oil which mainly comprises fatty acid methyl esters (FAME). Diesel-like fuels can be produced from many types of oils, such as rapeseed oil (rapeseed methyl ester, RME) and soybean oil (soy methyl ester, SME).

According to further embodiments, the internal combustion engine 1, as referred to herein, may an Otto engine with a spark-ignition device, wherein the Otto engine may be configured to run on petrol, alcohol, similar volatile fuels, or combinations thereof. Alcohol, such as ethanol, can be derived from renewable biomass. According to embodiments herein, the internal combustion engine 1 is a four-stroke internal combustion engine 1. For reasons of brevity and clarity, the internal combustion engine 1 is in some places herein referred to as the "combustion engine 1" or simply the "engine 1". Moreover, the internal combustion engine 1, as referred to herein, may be configured to power another type of unit or system than a vehicle, such as for example an electric generator.

Figure 3:
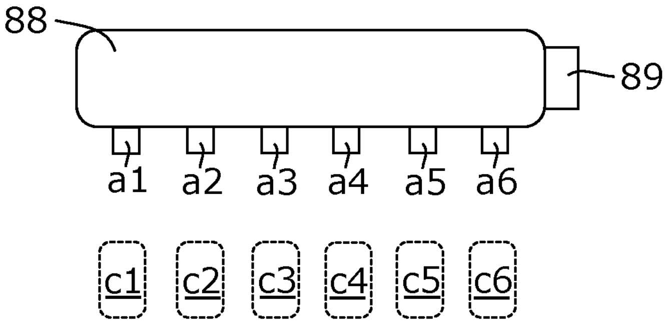

FIG. 3 schematically illustrates an inlet manifold 88 of the internal combustion engine 1 illustrated in FIG. 2. According to the illustrated embodiments, the inlet manifold 88 comprises one inlet air duct a1', a2', a3', a4', a5', a6' per cylinder c1-c6 of the combustion engine1. In other words, according to the illustrated embodiments, the inlet manifold 88 comprises the same number of inlet air ducts a1', a2', a3', a4', a5', a6' as the number of cylinders c1-c6 of the combustion engine 1. Each inlet air duct a1', a2', a3', a4', a5', a6' is configured to supply air to a cylinder c1-c6 of the combustion engine 1. In FIG. 3, the cylinders c1-c6 of the combustion engine 1 are schematically illustrated in dashed lines. The reference sign for the inlet air ducts a1', a2', a3', a4', a5', a6' of the inlet manifold 88 is in some places herein abbreviated "a1'-a6'" for reasons of brevity and clarity.

The combustion engine 1 may comprise more than one inlet manifold 88, such as two inlet manifolds 88, wherein each inlet manifold is arranged to supply air to a number of cylinders c1-c6 of the combustion engine 1. As an example, in embodiments in which the combustion engine 1 comprises cylinders c1-c6 arranged in more than one row, such as in an engine having cylinders c1-c6 in a V-configuration, the combustion engine 1 may comprise one inlet manifold 88 per row of cylinders c1-c6 of the combustion engine 1. As another example, the combustion engine 1 may comprise more than one inlet manifold 88 per row of cylinders c1-c6 of the combustion engine 1, such as two or three inlet manifolds 88 per row of cylinders c1-c6 of the combustion engine 1.

The inlet manifold 88 further comprises a common air inlet 89. The common air inlet 89 may be fluidly connected to a charge air cooler, a compressor of a turbocharger, and/or an air filter unit of the combustion engine 1.

Figure 4:
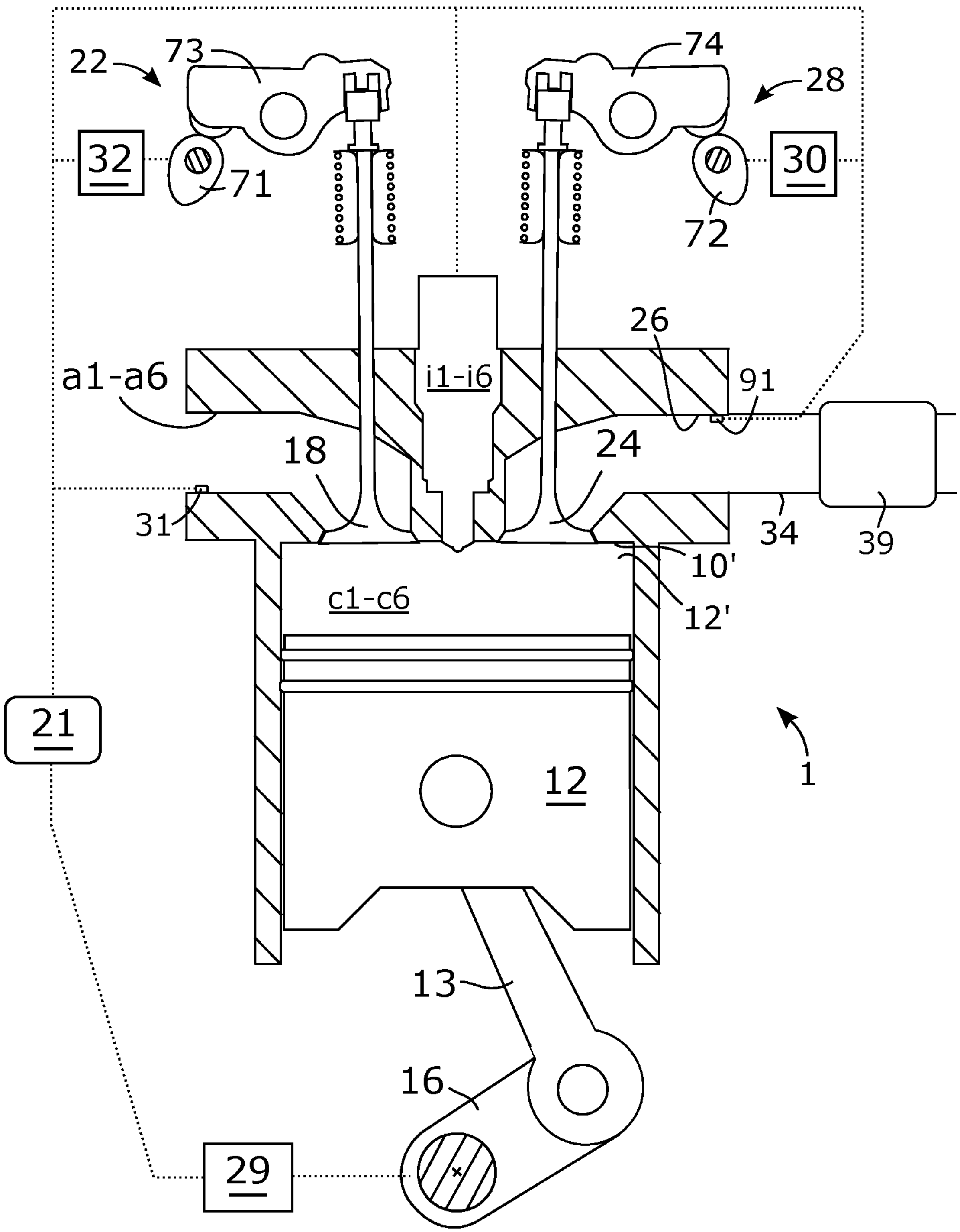
FIG. 4 schematically illustrates a cross sectional view of the internal combustion engine illustrated in FIG. 2.

FIG. 4 schematically illustrates a cross sectional view of the internal combustion engine 1 illustrated in FIG. 2. In FIG. 4, the cross section is made in a plane comprising a center axis of one of the cylinders c1-c6 of the engine 1. Below, simultaneous reference is made to FIG. 2, FIG. 3, and FIG. 4, if not indicated otherwise. Each cylinder c1-c6 of the combustion engine 1 comprises the same features and functions as the other cylinders c1-c6 of the combustion engine 1. Therefore, FIG. 4 can be said to represent a cross section of one of the cylinders c1-c6 of the engine 1, wherein the cylinder c1-c6 could be any of the cylinders c1-c6 of the combustion engine 1 illustrated in FIG. 2. The combustion engine 1 comprises a piston 12 arranged in each cylinder c1-c6. The piston 12 is connected, via a connecting rod 13 to a crankshaft 16, which at rotation moves the piston 12 forwards and backwards in the cylinder c1-c6, between a top dead center eentre TDC and a bottom dead center BDC.

Each cylinder c1-c6 of the combustion engine 1 comprises a respective air inlet a1, a2, a3, a4, a5, a6. In FIG. 4, the reference sign for the air inlet/inlets is abbreviated "a1-a6" for reasons of brevity and clarity as well as in some places herein. The air inlet a1-a6 of each cylinder c1-c6 is fluidly connected to an inlet air duct a1'-a6' of the inlet manifold 88 illustrated in FIG. 3. The engine 1 further comprises at least one inlet valve 18 arranged in each cylinder c1-c6, which at least one inlet valve 18 is connected with the air inlet a1-a6 of the cylinder c1-c6. The engine 1 further comprises an inlet valve control arrangement 22 configured to control each inlet valve 18 of the combustion engine 1 on the basis of a rotational position of the crankshaft 16. The combustion engine 1 further comprises at least one exhaust valve 24 arranged in each cylinder c1-c6, which at least one exhaust valve 24 is connected with an exhaust outlet 26 of the cylinder c1-c6. The engine 1 further comprises an exhaust valve control arrangement 28 configured to control each exhaust valve 24 on the basis of the rotational position of the crankshaft 16. In FIG. 4, the inlet valve 18 and the exhaust valve 24 are illustrated in a respective fully closed position. In a fully closed position, each valve 18, 24 abuts against a respective valve seat to close fluid connection between the cylinder c1-c6 and the respective air inlet a1-a6 and the exhaust outlet 26.

The inlet valve control arrangement 22 is arranged to control the at least one inlet valve 18 between the fully closed position and an open position by displacing the at least one inlet valve 18 in a direction into the cylinder c1-c6. A fluid connection is thereby opened between the air inlet a1-a6 and the cylinder c1-c6. Likewise, the exhaust valve control arrangement 28 is arranged to control the at least one exhaust valve 24 between the closed position to an open position by displacing the at least one exhaust valve 24 in a direction into the cylinder c1-c6. Thereby, a fluid connection is opened between the cylinder c1-c6 and the exhaust outlet 26. Upon displacement of a valve 18, 24 from the closed position to the open position, the valve 18, 24 is lifted from its valve seat.

Each cylinder c1-c6 of the combustion engine 1 comprises at least one fuel injector i1-i6 configured to inject fuel into the cylinder c1-c6. In other words, the combustion engine 1 comprises at least the same number of fuel injectors i1-i6 as the number of cylinders c1-c6 of the combustion engine 1. Each fuel injector i1-i6 is arranged to directly inject fuel into the cylinder c1-c6. As mentioned above, according to the illustrated embodiments, the engine 1 is a diesel engine, i.e. a type of compression ignition engine. According to further embodiments, the engine may be an Otto engine with a spark-ignition device, wherein the Otto engine may be designed to run on gas, petrol, alcohol or similar volatile fuels or combinations thereof. Such a fuel may also be directly injected into the cylinder c1-c6 using a fuel injector i1-i6.

According to the illustrated embodiments, the engine 1 comprises an exhaust after treatment system 39. The exhaust after treatment system 39 may comprise one or more of a catalytic converter, a particulate filter, a Selective catalytic reduction (SCR) arrangement, a Diesel Oxidation Catalyst (DOC), a Lean NOx Trap (LNT) and a Three-Way Catalyst (TWC).

The exhaust valve control arrangement 28 and the inlet valve control arrangement 22 may each comprise one or more camshafts 71, 72 rotatably connected to the crankshaft 16 of the engine 1. Moreover, the exhaust valve control arrangement 28 and the inlet valve control arrangement 22 may each comprise one or more arrangements, such as rocker arms 73, 74, for transferring movement of cam lobes of the camshafts 71, 72 to valve stems of the valves 18, 24 to move the valves 18, 24 to an open position upon rotation of the respective camshaft 71, 72. According to further embodiments, the cam lobes of the camshafts 71, 72 of the engine 1 may be arranged to displace valves 18, 24 to an open position by pressing onto valve stems of the valves 18, 24 upon rotation of the respective camshaft 71, 72. The exhaust valve control arrangement 28 and/or the inlet valve control arrangement 22 may according to further embodiments comprise electric, pneumatic, or hydraulic actuators arranged to control the valves 18, 24 on the basis of the rotational position of the crankshaft 16. The rotational position of the crankshaft 16 may be obtained using a crank angle sensor 29.

The exhaust valve control arrangement 28 comprises an exhaust valve phase-shifting device 30 configured to phase-shift control of the at least one exhaust valve 24 in relation to the crankshaft 16. Moreover, according to the illustrated embodiments, the inlet valve control arrangement 22 comprises an inlet valve phase-shifting device 32 configured to phase-shift control of the at least one inlet valve 18 in relation to the crankshaft 16.

The exhaust valve phase-shifting device 30 and the inlet valve phase-shifting device 32 may each comprise a hydraulic arrangement, for example using engine oil as hydraulic fluid, to phase-shift control of the valves 18, 24 in relation to the crankshaft 16. Such hydraulic arrangement may form part of a belt pulley, gear wheel, sprocket, or the like (not illustrated) arranged to transfer rotation from the crankshaft 16 to a camshaft 71, 72 of the exhaust valve control arrangement 28 and/or the inlet valve control arrangement 22. The hydraulic arrangement may be arranged to regulate an angular relationship between a first portion of the belt pulley, gear wheel, sprocket, or the like, being connected to the crankshaft 16, and a second portion of the belt pulley, gear wheel, sprocket, or the like, being connected to the camshaft 71, 72, in order to phase-shift control of the at least one inlet valve 18 and/or the at least one exhaust valve 24. In embodiments wherein the exhaust valve control arrangement 28 and/or the inlet valve control arrangement 22 comprises electric, pneumatic, or hydraulic actuators, the phase-shift of control of the at least one inlet valve 18 and/or the at least one exhaust valve 24 may be performed in another manner, for example by an electronic phase-shift of control.

Even though not illustrated in the figures, the engine 1 may comprise a turbocharger arranged to compress air to the inlet manifold 88 of the engine 1 illustrated in FIG. 3, and thus also to the air inlets a1-a6 of each cylinder c1-c6 of the engine 1. Thus, according to such embodiments, each air inlet a1-a6 of the combustion engine 1 may be fluidically connected to a compressor of a turbocharger. The compressor may be connected to a shaft which is connected to a turbine of the turbocharger. The turbine may be arranged to be driven by the flow of gases from an exhaust duct 34 of the engine 1. The engine 1 may comprise more than one turbocharger, wherein the turbochargers may be arranged in parallel or on series.

Moreover, even though not illustrated in the figures, the engine 1 may comprise an exhaust gas recirculation (EGR) system configured to circulate a portion of the exhaust gas from the exhaust outlets 26 of the cylinders c1-c6 to the air inlets a1-a6 of the cylinders c1-c6. The exhaust gas recirculation system may comprise an external recirculation system comprising duct arrangements arranged to transfer a portion of the engine's exhaust gas back to the inlet manifold 88 of the engine 1 and/or an internal system in which a portion of the engine's exhaust gas is kept in, or recirculated in and out of, a cylinder c1-c6 of the combustion engine 1 by engine valve control.

The engine 1 comprises a control arrangement 21. The control arrangement 21 is operably connected to each fuel injector i1-i6 of the engine 1 and is configured to control operation thereof, as is further explained herein. Moreover, according to the illustrated embodiments, the control arrangement 21 is operably connected to the exhaust valve phase-shifting device 30 and to the inlet valve phase-shifting device 32 and is configured to control operation thereof, as also is further explained herein. Furthermore, according to the illustrated embodiments, the control arrangement 21 is operably connected to, and is configured to obtain data from, an inlet air temperature sensor 31 arranged at each air inlet a1-a6 of the combustion engine 1, an exhaust temperature sensor 91 arranged at each exhaust outlet 26 of the combustion engine 1, and a crank angle sensor 29. The control arrangement 21 may be operably connected to one or more further components and systems of the engine 1, such as the inlet valve control arrangement 22 and the exhaust valve control arrangement 28 and may be configured to control operation thereof. Furthermore, the control arrangement 21 may be connected to a number of other types of sensors to obtain signals therefrom. Examples are sensors arranged to sense exhaust pressure, charge air temperature, mass airflow, engine speed, engine load, absolute pressure in the inlet manifold, and the like.

According to embodiments herein, the control arrangement 21 is configured to control the fuel injection performed by the fuel injectors i1-i6 of the combustion engine 1 into the cylinders c1-c6 of the combustion engine 1 based on an estimate of a residual gas imbalance between the at least two cylinders c1-c6.

The term residual gas in a cylinder c1-c6 of the combustion engine 1 is in herein defined as exhaust gas from a previous combustion cycle of the combustion engine 1. The residual gas may thus derive from the current cylinder c1-c6 or another cylinder c1-c6 of the combustion engine 1. Moreover, the residual gas may have entered the cylinder c1-c6 via an internal or external exhaust gas recirculation EGR system of the combustion engine 1, may have entered the cylinder c1-c6 as a result of the engine valve control, or may simply occupy the cylinder c1-c6 as a result of a non-complete gas exchange in a previous gas exchanging phase of the cylinder c1-c6. A high amount of residual gas in a cylinder c1-c6 reduces the formation of nitrogen oxides NOx but increases the formation of soot in the cylinder c1-c6. Correspondingly, a low amount of residual gas in a cylinder c1-c6 decreases the formation of soot but increases the formation of nitrogen oxides NOx in the cylinder c1-c6.

The term residual gas imbalance between the at least two cylinders c1-c6 of the combustion engine 1 is herein defined as a difference in the amount of residual gas between the at least two cylinders c1-c6. The amount of residual gas in a cylinder c1-c6 may refer to weight, volume, or a fraction between residual gas and other gaseous substances in the cylinder c1-c6, including fresh air.

Since the control arrangement 21 is configured to control the fuel injection performed by the fuel injectors i1-i6 into the cylinders c1-c6 based on the estimate of a residual gas imbalance between the at least two cylinders c1-c6, a control arrangement 21 is provided capable of reducing the negative effects of residual gas imbalances between the cylinders c1-c6 of the engine in an efficient manner. That is, a control arrangement 21 is provided having conditions for compensating differences in the combustion properties between the cylinders c1-c6 of the combustion engine 1 caused by residual gas imbalances between the cylinders c1-c6.

According to some embodiments, the control arrangement 21 is configured to perform an individual control of the fuel injection performed by each fuel injector i1-i6 into the cylinders c1-c6 based on the estimate. Moreover, according to some embodiments, the control arrangement 21 is configured to control at least one of a fuel injection amount and a fuel injection timing of each fuel injector i1-i6 based on the estimate of the residual gas imbalance. Thereby, the control arrangement 21 can reduce the negative effects of residual gas imbalances between the cylinders c1-c6 of the engine 1 in a simple and efficient manner thereby allowing the engine 1 to operate in operational modes causing higher imbalances of the residual gas between the cylinders c1-c6, as is further explained herein. The control arrangement 21 may be configured to control the fuel injection amount by controlling a duration of a needle opening event of a fuel injector i1-i6.

According to some embodiments, the control arrangement 21 is configured to reduce the fuel injection amount of a fuel injector i1-i6 if the estimate indicates a high amount of residual gas in the cylinder c1-c6 comprising the fuel injector i1-i6. As mentioned, a high amount of residual gas in a cylinder c1-c6 increases the formation of soot and reduces the formation of nitrogen oxides NOx. However, by the reduction in the fuel injection amount of a fuel injector i1-i6 if the estimate indicates a high amount of residual gas in the cylinder c1-c6, the control arrangement 21 can restore the balance between soot formation and NOx formation in the cylinder c1-c6 in a simple and efficient manner. This is because a reduction in the fuel injection amount tends to reduce the formation of soot and increase the formation of nitrogen oxides NOx in the cylinder c1-c6. Thus, the control arrangement 21 according to the embodiments herein can level out the formation of soot and nitrogen oxides NOx among the cylinders c1-c6 of the engine 1 in a simple and efficient manner which can reduce the total emission levels of the engine 1.

Moreover, according to some embodiments, the control arrangement 21 is configured to increase the fuel injection amount of a fuel injector i1-i6 if the estimate indicates a low amount of residual gas in the cylinder c1-c6 comprising the fuel injector i1-i6. As mentioned, a low amount of residual gas in a cylinder c1-c6 decreases the formation of soot and increases the formation of nitrogen oxides NOx. However, by the increase of the fuel injection amount of a fuel injector i1-i6 if the estimate indicates a low amount of residual gas in the cylinder c1-c6, the control arrangement 21 can restore the balance between soot formation and NOx formation in the cylinder c1-c6 in a simple and efficient manner. This is because an increase in the fuel injection amount tends to increase the formation of soot and reduce the formation of nitrogen oxides NOx in the cylinder c1-c6. Thus, the control arrangement 21 according to the embodiments herein can level out the formation of soot and nitrogen oxides NOx among the cylinders c1-c6 of the combustion engine 1 in a simple and efficient manner which can reduce the total emission levels of the combustion engine 1.

Thus, the control arrangement 21 of the present disclosure can control the injection of fuel into each cylinder c1-c6 to minimize the formation of nitrogen oxides NOx and soot so as to minimize the total emission levels of these substances from the combustion engine 1. Furthermore, since the control arrangement 21 is configured to control the fuel injection performed by the fuel injectors i1-i6 into the cylinders c1-c6 based on the estimate of the residual gas imbalance, a control arrangement 21 is provided capable of reducing the negative effects of engine control strategies causing higher residual gas imbalances between the cylinders c1-c6 of the combustion engine 1. Thereby, a control arrangement 21 is provided allowing control strategies to be used which can increase the exhaust temperature in an efficient manner while keeping the formation of nitrogen oxides NOx and soot at low levels as is further explained herein.

According to some embodiments, the control arrangement 21 is configured to provide the estimate of the imbalance between residual gas in the at least two cylinders c1-c6 of the combustion engine 1. In some places herein, the imbalance between residual gas in the at least two cylinders c1-c6 of the combustion engine 1 is simply referred to as "the residual gas imbalance" for reasons of brevity and clarity.

According to some embodiments, the control arrangement 21 is configured to obtain temperature data representative of a temperature at a respective air inlet a1-a6 of the at least two cylinders c1-c6 and provide the estimate based on the temperature data. The control arrangement 21 may be configured to obtain the temperature data representative of a temperature at a respective air inlet a1-a6 of the at least two cylinders c1-c6 from an inlet air temperature sensor 31 arranged at each air inlet a1-a6 of the combustion engine 1. In FIG. 4, the inlet air temperature sensor 31 is illustrated as positioned inside the air inlet a1-a6 of the cylinder c1-c6. However, the inlet air temperature sensor 31 may be arranged outside of the air inlet a1-a6 of the cylinder c1-c6 and/or may be in thermal contact with the air inlet a1-a6 of the cylinder c1-c6. As a further alternative, the inlet manifold 88 illustrated in FIG. 3 may comprise one inlet air temperature sensor 31 per inlet air duct a1'-a6', wherein each inlet air temperature sensor 31 is configured to sense a current temperature of a respective inlet air duct a1'-a6' of the inlet manifold 88 of the combustion engine 1.

A higher temperature of an air inlet a1-a6 of a cylinder c1-c6, and/or a higher temperature of an inlet air duct a1'-a6' of the inlet manifold 88, indicates a higher amount of residual gas in a cylinder c1-c6 as compared to a lower temperature. This is because residual gas has, in almost all cases, a higher temperature than surrounding air. Thus, by obtaining temperature data representative of a temperature at a respective air inlet a1-a6 of the at least two cylinders c1-c6, and provide the estimate based on the temperature data, accurate estimates of the residual gas imbalance can be provided.

As an alternative, or in addition, the control arrangement 21 may be configured to obtain exhaust temperature data representative of an exhaust temperature at a respective exhaust outlet 26 of the at least two cylinders c1-c6 and provide the estimate based on the exhaust temperature data. The control arrangement 21 may be configured to obtain the exhaust temperature data from an exhaust temperature sensor 91 arranged at each exhaust outlet 26 of the combustion engine 1. In FIG. 4, the exhaust temperature sensor 91 is illustrated as positioned inside the exhaust outlet 26 of the cylinder c1-c6. However, the exhaust temperature sensor 91 may be arranged outside of the exhaust outlet 26 of the cylinder c1-c6 and/or may be in thermal contact with the exhaust outlet 26 of the cylinder c1-c6.

A higher exhaust temperature at an exhaust outlet 26 of a cylinder c1-c6 indicates a lower amount of residual gas in a cylinder c1-c6 as compared to a higher exhaust temperature. This is because residual gas in a cylinder c1-c6 reduces the temperature by heat absorption and through lowering the oxygen concentration in the cylinder c1-c6. Thus, by obtaining exhaust temperature data representative of an exhaust temperature at a respective exhaust outlet 26 of the at least two cylinders c1-c6 and provide the estimate based on the exhaust temperature data, accurate estimates of the residual gas imbalance can be provided.

As a further alternative, or in addition, the control arrangement 21 may be configured to obtain engine operation data of the combustion engine 1 and may be configured to provide the estimate of the residual gas imbalance between the at least two cylinders c1-c6 based on the engine operation data. The engine operation data of the combustion engine 1 may comprise one or more of an engine speed of the combustion engine 1, an engine load of the combustion engine 1, and a current phase shift of the control of exhaust valves 24 and/or inlet valves 18 of the engine 1, current cylinder pressures of the cylinders c1-c6 of the combustion engine 1, or the like.

Figure 5A:
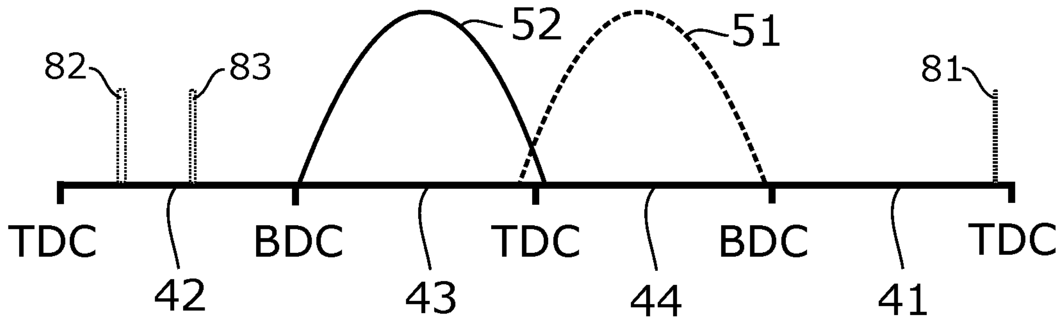
FIG. 5*a* illustrates valve lift events of the at least one inlet valve, and valve lift events of the at least one exhaust valve, during a first operational mode of the engine illustrated in FIG. 2.
Figure 5B:
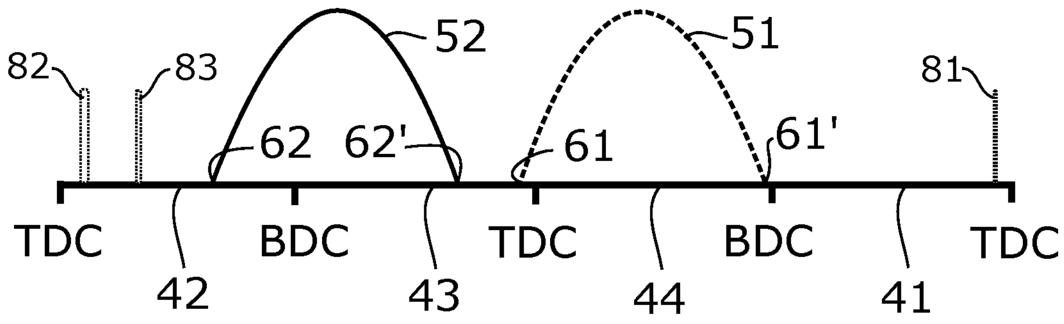
FIG. 5*b* illustrates valve lift events of the at least one inlet valve and valve lift events of the at least one exhaust valve, during a second operational mode of the engine illustrated in FIG. 2.
Figure 5C:
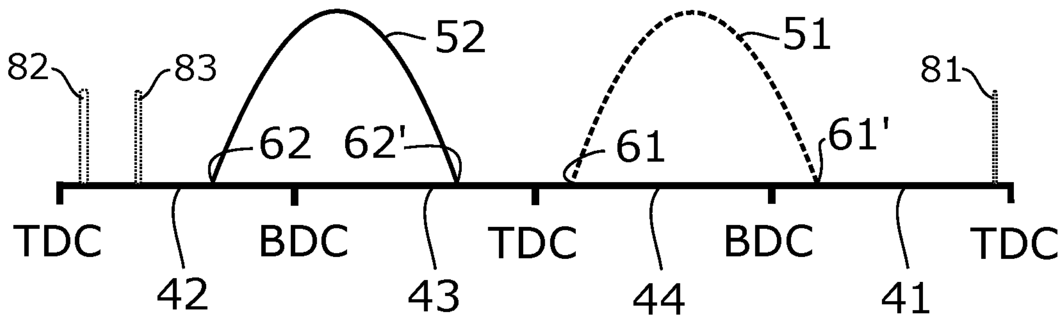
FIG. 5*c* illustrates the second operational mode illustrated in FIG. 5*b*, in which the control of the inlet valves of the combustion engine has been retarded.

FIG. 5*a*-FIG. 5*c* illustrate valve lift events 51, 52 and injection events 81, 82, 83 in different operational modes of the engine 1 illustrated in FIG. 2. The different operational modes of the engine 1 may also be referred to as engine control strategies of the combustion engine 1. FIG. 5*a*-FIG. 5*c* illustrate the valve lift events 51, 52 and injection events 81, 82, 83 performed during two revolutions of the crank shaft 16, i.e. during all four strokes of the four-stroke internal combustion engine 1. In these figures, the strokes are illustrated in the following order: compression stroke 41, expansion stroke 42, exhaust stroke 43 and inlet stroke 44. Below, simultaneous reference is made to FIG. 2, FIG. 3, FIG. 4, and FIG. 5*a*-FIG. 5*c*, if not indicated otherwise.

FIG. 5*a* illustrates valve lift events 51 of the at least one inlet valve 18, and valve lift events 52 of the at least one exhaust valve 24 of a cylinder c1-c6, during a first operational mode of the engine 1 illustrated in FIG. 2. As indicated, during the compression stroke 41 and the expansion stroke 42, the at least one inlet valve 18 and the at least one exhaust valve 24 are closed. When the piston reaches the bottom dead center BDC at the end of the expansion stroke 42, the exhaust valve control arrangement 28 controls the at least one exhaust valve 24 to an open position to allow exhaust gases to be expelled from the cylinder c1-c6 to the exhaust outlet 26 during the exhaust stroke 43. In the transition area between the exhaust stroke 43 and the inlet stroke 44, the exhaust valve control arrangement 28 controls the at least one exhaust valve 24 to a closed position.

Moreover, in the transition area between the exhaust stroke 43 and the inlet stroke 44, the inlet valve control arrangement 22 controls the at least one inlet valve 18 to an open position to allow air, or an air/fuel mixture, to enter the cylinder c1-c6 during the inlet stroke 44. Towards the end of the inlet stroke 44, the inlet valve control arrangement 22 controls the at least one inlet valve 18 to a closed position to allow compression of the air, or the air/fuel mixture, in the subsequent compression stroke 41.

FIG. 5*a* further illustrates a pilot injection 81, a main injection 82, and a post injection 83. The control arrangement 21 of the combustion engine 1 may thus control each fuel injector i1-i6 of the combustion engine 1 to perform pilot injection 81, a main injection 82, and a post injection 83 into the respective cylinder c1-c6. In FIG. 5*a*, the pilot injection 81 is injected towards the end of the compression stroke 41. The pilot injection 81 can ensure combustion and create prerequisites for a main combustion. The main injection 82 results in the main combustion which occurs during the expansion stroke 42. The post injection 83 is injected after the main injection 82 into the cylinder c1-c6 in the expansion stroke 42. The post injection of fuel can produce more heat to the exhausts which can increase the exhaust temperature of the combustion engine 1.

The valve lift events 51 of the at least one inlet valve 18 and the valve lift events 52 of the at least one exhaust valve 24 illustrated in FIG. 5*a* may be the same during normal engine braking of the engine 1, occurring for example when a driver of a vehicle releases an accelerator pedal.

FIG. 5*b* illustrates valve lift events 51 of the at least one inlet valve 18 and valve lift events 52 of the at least one exhaust valve 24, during a second operational mode of the engine 1 illustrated in FIG. 2. Below, simultaneous reference is made to FIG. 2-FIG. 5*b*, if not indicated otherwise. The second operational mode may be used when it is wanted to activate, or maintain function of, the exhaust after treatment system 39 of the combustion engine 1. As an alternative, or in addition, the second operational mode may be used when it is wanted to increase the available exhaust energy for a turbine of a turbocharger of the combustion engine 1, or when it is wanted to increase the exhaust temperature or available exhaust energy for another reason.

In this second operational mode, the control arrangement 21 is configured to advance control of the exhaust valves 24 of the internal combustion engine 1. The control arrangement 21 may advance control of the exhaust valves 24 of the internal combustion engine 1 by controlling the exhaust valve phase-shifting device 30. The advancement of the control of the exhaust valves 24 of the engine 1 results in earlier opening events 62 of the exhaust valves 24 and earlier closing events 62' of the exhaust valves 24 than before the advancement of the control, as can be seen in FIG. 5*b*.

The early opening event 62 of an exhaust valve 24 interrupts the expansion in the expansion stroke 42 which results in less torque being supplied to the crankshaft 16 of the combustion engine 1 and hotter exhaust gases. The early closing event 62' of the exhaust valve 24 results in trapping significantly more hot residual gas in in the cylinder c1-c6 during the exhaust stroke 43 thereof. Since the piston 12 is moving towards the top dead center TDC in the exhaust stroke 43, the trapped residual gas is recompressed in the cylinder c1-c6, which potentially increases the pumping work.

In addition, when the inlet valve/valves 18 of the cylinder c1-c6 opens, such as at the opening event 61 illustrated in FIG. 5*b*, the recompressed trapped residual gas is flowing out of the cylinder c1-c6 via the air inlet a1-a6 into the inlet manifold 88 of the engine 1. This may cause significant residual gas imbalances between the cylinders c1-c6 of the combustion engine 1 because residual gas from one cylinder c1-c6 of the combustion engine 1 may flow into another cylinder c1-c6 of the combustion engine 1 in the inlet stroke of the other cylinder c1-c6.

The combustion engine 1 according to the illustrated embodiments has the following firing order of the cylinders c1-c6: cylinder one c1-cylinder five c5-cylinder three c3-cylinder six c6-cylinder two c2-cylinder c4. As an example, when the combustion engine 1 is operating in the second operational mode illustrated in FIG. 5, residual gas leaving the fifth cylinder c5 of the engine 1 may be transferred into the fourth and sixth cylinder c4, c6 of the combustion engine 1 via the inlet manifold 88 illustrated in FIG. 3. When operating in the second operational mode, the cylinders c1-c6 of the combustion engine 1 will not receive equal amounts of residual gas from the other cylinders c1-c6 due to the positions of the respective air inlets a1-a6 and the firing order of the cylinders c1-c6 of the combustion engine 1. Therefore, operating in the second operational mode may cause significant residual gas imbalances between the cylinders c1-c6 of the combustion engine 1. The engine 1, as referred to herein, may have another firing order than the above specified.

Since the control arrangement 21 is configured to control the fuel injection performed by the fuel injectors i1-i6 into the cylinders c1-c6 based on an estimate of a residual gas imbalance between the at least two cylinders c1-c6, such significant residual gas imbalances can be compensated for. In this manner, the engine 1 is allowed to operate in the second operational mode to increase the exhaust temperature in an efficient manner while avoiding excessive emissions of nitrogen dioxide NOx and soot from the combustion engine 1.

According to some embodiments, the control arrangement 21 is configured to control the amount of air pumped through the combustion engine 1 by phase shifting control of the inlet valves 18 of the combustion engine 1.

FIG. 5*c* illustrates the second operational mode illustrated in FIG. 5*b*, in which the control of the inlet valves 18 of the combustion engine 1 has been retarded. Below, simultaneous reference is made to FIG. 2-FIG. 5*c*, if not indicated otherwise. As can be seen when comparing FIG. 5*b* and FIG. 5*c*, the retardation of the control of the inlet valves 18 of the combustion engine 1 results in a delayed opening event 61 of the inlet valve/valves 18 and a delayed closing event 61' of the inlet valve/valves 18 of the combustion engine 1. Due to the phase shifting of control of the inlet valves 18 of the combustion engine 1, the control arrangement 21 can control the geometric compression ratio as well as the residual gas imbalance between the cylinders c1-c6. That is, a late/delayed opening event 61 of the inlet valve/valves 18 result in a more homogenous gas composition over the cylinders c1-c6, i.e., less residual gas imbalance between the cylinders c1-c6 of the combustion engine 1. In this manner, the injection strategies can be further optimized with respect to NOx and smoke. Furthermore, conditions are provided for using the second operational mode also higher up in engine load.

According to some embodiments, the control arrangement 21 is configured to advance the fuel injection timing of a fuel injector i1-i6 if the estimate indicates a high amount of residual gas in the cylinder c1-c6 comprising the fuel injector i1-i6. As mentioned, a high amount of residual gas in a cylinder c1-c6 normally increases the formation of soot and reduces the formation of nitrogen oxides NOx in the cylinder c1-c6. However, due to the advancement of the fuel injection timing of a fuel injector i1-i6 if the estimate indicates a high amount of residual gas in the cylinder c1-c6, the control arrangement 21 can restore the balance between soot formation and NOx formation in the cylinder c1-c6 in a simple and efficient manner. This is because an advancement of the fuel injection timing tends to reduce the formation of soot and increase the formation of nitrogen oxides NOx in the cylinder c1-c6. Thus, a control arrangement 21 is provided capable of levelling out the formation of soot and nitrogen oxides NOx among the cylinders c1-c6 of the combustion engine 1 in a simple and efficient manner which can reduce the total emission levels of the combustion engine 1.

According to some embodiments, the control arrangement 21 is configured to retard the fuel injection timing of a fuel injector i1-i6 if the estimate indicates a low amount of residual gas in the cylinder c1-c6 comprising the fuel injector i1-i6. As mentioned, a low amount of residual gas in a cylinder c1-c6 normally reduces the formation of soot and increases the formation of nitrogen oxides NOx in the cylinder c1-c6. However, due to the retardation of the fuel injection timing of a fuel injector i1-i6 if the estimate indicates a low amount of residual gas in the cylinder c1-c6, a control arrangement 21 is provided capable of restoring the balance between soot formation and NOx formation in the cylinder c1-c6 in a simple and efficient manner. This is because a retardation of the fuel injection timing tends to increase the formation of soot and reduce the formation of nitrogen oxides NOx in the cylinder c1-c6.

Thus, a control arrangement 21 is provided capable of levelling out the formation of soot and nitrogen oxides NOx among the cylinders c1-c6 of the combustion engine 1 in a simple and efficient manner which can reduce the total emission levels of the combustion engine 1.

According to some embodiments, the control arrangement 21 is configured to control at least one of a fuel injection amount and a fuel injection timing of the main injection 82. Thereby, a control arrangement 21 is provided capable of reducing the negative effects of residual gas imbalances between the cylinders c1-c6 of the combustion engine 1 in an effective manner thereby allowing the combustion engine 1 to operate in operational modes causing higher imbalances of the residual gas between the cylinders c1-c6.

According to some embodiments, the control arrangement 21 is configured to control the fuel injection timing of the fuel injectors i1-i6 based on a current phase shift of the control of the exhaust valves 24. That is, as can be seen when comparing FIGS. 5*a*-5*c*, the injection timing of the main injection 83 has been advanced in FIGS. 5*b* and 5*c* as compared to in 5*a*. Thereby, the control arrangement 21 can control and increase the exhaust temperature while ensuring a stable and efficient combustion in the cylinders c1-c6 of the combustion engine 1. The fuel injection timing of the pilot injection 81 and/or of the post injection 83 may also be controlled based on a current phase shift of the control of the exhaust valves 24 to ensure a stable and efficient combustion in the cylinders c1-c6 of the combustion engine 1 while obtaining an increased exhaust temperature.

Figure 6:
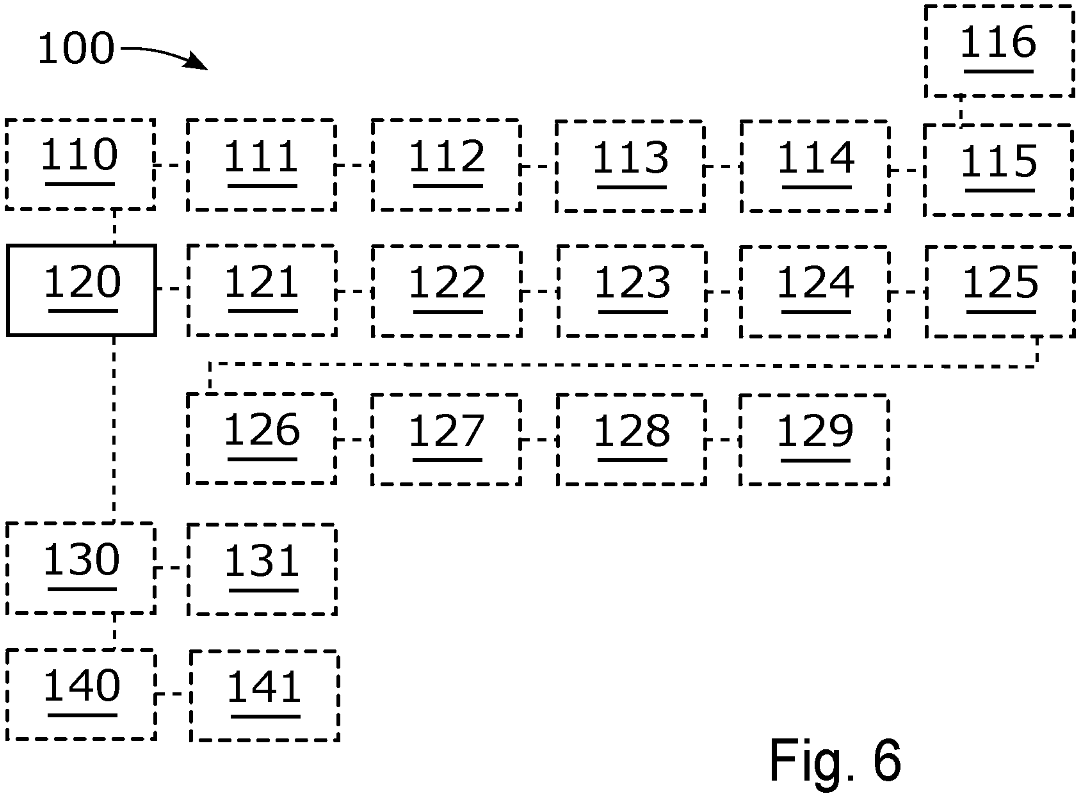
FIG. 6 illustrates a method of controlling an internal combustion engine.

FIG. 6 illustrates method 100 of controlling an internal combustion engine 1. The internal combustion engine 1 may be a combustion engine 1 according to the embodiments explained with reference to FIG. 1-FIG. 5*c*. Therefore, in the following, simultaneous reference is made to FIG. 1-FIG. 6, if not indicated otherwise.

The method 100 is a method of controlling an internal combustion engine 1, the internal combustion engine 1 comprising at least two cylinders c1-c6, wherein each cylinder c1-c6 comprises at least one fuel injector i1-i6 configured to inject fuel into the cylinder c1-c6, and wherein the method 100 comprises the step of:

- controlling 120 the fuel injection performed by the fuel injectors i1-i6 into the cylinders c1-c6 based on an estimate of a residual gas imbalance between the at least two cylinders c1-c6.

According to some embodiments, each cylinder c1-c6 comprises at least one exhaust valve 24, and wherein the method 100 comprises the step of:

- advancing 130 control of the exhaust valves 24 of the internal combustion engine 1.

Moreover, according to some embodiments, each cylinder c1-c6 comprises at least one inlet valve 18, and wherein the method 100 comprises the step of:

- controlling 140 the amount of air pumped through the engine by phase shifting control of the inlet valves 18 of the internal combustion engine 1.

Furthermore, according to some embodiments, the phase shifting of the control of the at least one inlet valve 18 comprises the step of:

- retarding 141 control of the inlet valves 18 of the internal combustion engine 1.

The step of controlling 120 the fuel injection performed by the fuel injectors i1-i6 may comprise the step of:

- performing 121 an individual control of the fuel injection performed by each fuel injector i1-i6 into the cylinders c1-c6 based on the estimate.

According to some embodiments, the step of controlling 120 the fuel injection performed by the fuel injectors i1-i6 comprises the step of:

- controlling 122 at least one of a fuel injection amount and a fuel injection timing.

Moreover, according to some embodiments, the step of controlling 120 the fuel injection performed by the fuel injectors i1-i6 comprises the step of:

- reducing 123 the fuel injection amount of a fuel injector i1-i6 if the estimate indicates a high amount of residual gas in the cylinder c1-c6 comprising the fuel injector i1-i6.

Furthermore, according to some embodiments, the step of controlling 120 the fuel injection performed by the fuel injectors i1-i6 comprises the step of:

- increasing 124 the fuel injection amount of a fuel injector i1-i6 if the estimate indicates a low amount of residual gas in the cylinder c1-c6 comprising the fuel injector i1-i6.

The step of controlling 120 the fuel injection performed by the fuel injectors i1-i6 may comprise the step of:

- advancing 125 the fuel injection timing of a fuel injector i1-i6 if the estimate indicates a high amount of residual gas in the cylinder c1-c6 comprising the fuel injector i1-i6.

According to some embodiments, the step of controlling 120 the fuel injection performed by the fuel injectors i1-i6 comprises the step of:

- retarding 126 the fuel injection timing of a fuel injector i1-i6 if the estimate indicates a low amount of residual gas in the cylinder c1-c6 comprising the fuel injector i1-i6.

Moreover, according to some embodiments, the step of controlling 120 the fuel injection performed by the fuel injectors i1-i6 comprises the step of:

- controlling 127 the fuel injectors i1-i6 to perform a pilot injection 81, a main injection 82, and a post injection 83.

Furthermore, according to some embodiments, the step of controlling 127 the fuel injection performed by the fuel injectors i1-i6 comprises the step of:

- controlling 128 at least one of a fuel injection amount and a fuel injection timing of the main injection 82.

Optionally, each cylinder c1-c6 comprises at least one exhaust valve 24, and wherein the method 100 comprises the step of:

- phase shifting control 131 of the exhaust valves 24 of the internal combustion engine 1, and
- controlling 129 the fuel injection timing of the fuel injectors i1-i6 based on a current phase shift of the control of the exhaust valves 24.

The method 100 may comprise the step of:

- providing 110 the estimate of a residual gas imbalance between the at least two cylinders c1-c6.

The step of providing 110 the estimate may be performed prior to the step of controlling 120 the fuel injection performed by the fuel injectors i1-i6 into the cylinders c1-c6 based on the estimate.

According to some embodiments, the step of providing 110 the estimate of the residual gas imbalance between the at least two cylinders c1-c6 comprises the steps of:

- obtaining 111 temperature data representative of a temperature at a respective air inlet a1-a6 of the at least two cylinders c1-c6, and
- providing 113 the estimate based on the temperature data.

As an alternative, or in addition, the step of providing 110 the estimate of the residual gas imbalance between the at least two cylinders c1-c6 may comprise the steps of:

- obtaining 112 engine operation data representative of one or more of an engine speed, an engine load, and a current phase shift of the control of exhaust valves 24 and/or inlet valves 18 of the internal combustion engine 1, and
- providing 114 the estimate based on the engine operation data.

As a further alternative, or in addition, the step of providing 110 the estimate of the residual gas imbalance between the at least two cylinders c1-c6 may comprise the steps of:

- obtaining 115 exhaust temperature data representative of a temperature at a respective exhaust outlet 26 of the at least two cylinders c1-c6, and
- providing 116 the estimate based on the exhaust temperature data.

It will be appreciated that the various embodiments described for the method 100 are all combinable with the control arrangement 21 as described herein. That is, the control arrangement 21 may be configured to perform any one of the method steps 110, 111, 112, 113, 114, 115, 116, 120, 121, 122, 123, 124, 125, 126, 127, 128, 129, 130, 131, 140, and 141 of the method 100.

Figure 7:
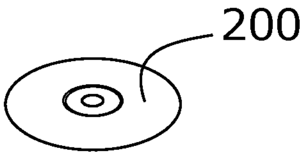
FIG. 7 illustrates a computer-readable medium according to some embodiments.

FIG. 7 illustrates a computer-readable medium 200 comprising instructions which, when executed by a computer, cause the computer to carry out the method 100 according to some embodiments of the present disclosure. According to some embodiments, the computer-readable medium 200 comprises a computer program comprising instructions which, when the program is executed by a computer, cause the computer to carry out the method 100 according to some embodiments.

One skilled in the art will appreciate that the method 100 of controlling an internal combustion engine 1 may be implemented by programmed instructions. These programmed instructions are typically constituted by a computer program, which, when it is executed in the control arrangement 21, ensures that the control arrangement 21 carries out the desired control, such as the method steps 110, 111, 112, 113, 114, 115, 116, 120, 121, 122, 123, 124, 125, 126, 127, 128, 129, 130, 131, 140, and 141 described herein. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the internal combustion engine 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the internal combustion engine 1 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the internal combustion engine 1 comprises a control arrangement 21 but might alternatively be implemented wholly or partly in two or more control arrangements or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles and engines of the type here concerned are therefore often provided with significantly more control arrangements than depicted in FIG. 4, as one skilled in the art will surely appreciate.

The computer program product 200 may be provided for instance in the form of a data carrier carrying computer program code for performing at least some of the method steps 110, 111, 112, 113, 114, 115, 116, 120, 121, 122, 123, 124, 125, 126, 127, 128, 129, 130, 131, 140, and 141 according to some embodiments when being loaded into one or more calculation units of the control arrangement 21. The data carrier may be, e.g. a CD ROM disc, as is illustrated in FIG. 7, or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

The features "advanced" and "advancing", as used herein means that a control or event referred to is performed earlier regarding crank angle degrees or time, as compared to if the control or event would not be advanced. The features "retarded" and "retarding", as used herein means that a control or event referred to is performed later regarding crank angle degrees or time, as compared to if the control or event would not be retarded.

The term high amount of residual gas in the cylinder c1-c6 as used herein may be interpreted as meaning an amount of residual gas higher than one or more threshold values. Accordingly, the control arrangement 21 may use the estimate of the imbalance between residual gas in the at least two cylinders c1-c6 and may be configured to compare the amount of residual gas in a cylinder c1-c6 with one or more threshold values and may be configured to perform one or more measures if the estimate indicates that the amount of residual gas in a cylinder c1-c6 exceeds one or more threshold values. As understood from the herein described, the one or more measures may comprise reducing the fuel injection amount of the fuel injector i1-i6 comprised in cylinder c1-c6 and/or advancing the fuel injection timing of the fuel injector comprised in the cylinder c1-c6.

Likewise, the term low amount of residual gas in the cylinder c1-c6 as used herein may be interpreted as meaning an amount of residual gas lower than one or more threshold values. Accordingly, the control arrangement 21 may use the estimate of the imbalance between residual gas in the at least two cylinders c1-c6 to compare the amount of residual gas in a cylinder c1-c6 with one or more threshold values and may be configured to perform one or more measures if the estimate indicates that the amount of residual gas in a cylinder c1-c6 is below one or more threshold values. As understood from the herein described, the one or more measures may comprise increasing the fuel injection amount of the fuel injector i1-i6 comprised in the cylinder c1-c6 and/or retarding the fuel injection timing of the fuel injector i1-i6 comprised in the cylinder c1-c6.

Furthermore, the control arrangement 21 may use the estimate of a residual gas imbalance between the at least two cylinders c1-c6 and may be configured to compare the amount of residual gas in between the at least two cylinders c1-c6 and may be configured to perform one or more measures in response to the comparison, such as reducing the fuel injection amount of the fuel injector i1-i6 of a cylinder c1-c6 for which the estimate indicates a higher amount of residual gas as compared to one or more other cylinders c1-c6 of the engine 1 and/or increasing the fuel injection amount of the fuel injector i1-i6 of a cylinder c1-c6 for which the estimate indicates a lower amount of residual gas as compared to one or more other cylinders c1-c6 of the engine 1. Moreover, according to such embodiments, the control arrangement 21 may be configured to perform one or more measures in response to such comparison comprising advancing the fuel injection timing of the fuel injector i1-i6 of a cylinder c1-c6 for which the estimate indicates a higher amount of residual gas as compared to one or more other cylinders c1-c6 of the engine 1 and/or retarding the fuel injection timing of the fuel injector i1-i6 of a cylinder c1-c6 for which the estimate indicates a lower amount of residual gas as compared to one or more other cylinders c1-c6 of the engine 1.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term “comprising” or “comprises” is open-ended, and includes one or more stated features, elements, steps, components, or functions but does not preclude the presence or addition of one or more other features, elements, steps, components, functions, or groups thereof.

The invention claimed is:

1. A method of controlling an internal combustion engine, the internal combustion engine comprising at least two cylinders, wherein each cylinder comprises at least one fuel injector configured to inject fuel into the cylinder, and wherein the method comprises:

controlling the fuel injection performed by the fuel injectors into the cylinders based on an estimate of a residual gas imbalance between the at least two cylinders, wherein said controlling the fuel injection performed by the fuel injectors comprises:

advancing a fuel injection timing of a fuel injector if the estimate of the residual gas imbalance between the at least two cylinders exceeds a threshold amount of residual gas in the cylinder comprising the fuel injector; and retarding the fuel injection timing of the fuel injector if the estimate of the residual gas imbalance between the at least two cylinders is less than a threshold amount of residual gas in the cylinder comprising the fuel injector.

2. The method according to claim 1, wherein controlling the fuel injection performed by the fuel injectors:

performing an individual control of the fuel injection performed by each fuel injector into the cylinders based on the estimate.

3. The method according to claim 1, wherein controlling the fuel injection performed by the fuel injectors comprises:

controlling a fuel injection amount.

4. The method according to claim 3, wherein controlling the fuel injection performed by the fuel injectors comprises:

reducing the fuel injection amount of a fuel injector if the estimate exceeds a threshold amount of residual gas in the cylinder comprising the fuel injector.

5. The method according to claim 3, wherein controlling the fuel injection performed by the fuel injectors comprises:

increasing the fuel injection amount of a fuel injector if the estimate is less than a threshold amount of residual gas in the cylinder comprising the fuel injector.

6. The method according to claim 1, wherein controlling the fuel injection performed by the fuel injectors comprises:

controlling the fuel injectors to perform a pilot injection, a main injection, and a post injection.

7. The method according to claim 6, wherein controlling the fuel injection performed by the fuel injectors comprises:

controlling at least one of a fuel injection amount and a fuel injection timing of the main injection.

8. The method according to claim 1, wherein each cylinder comprises at least one exhaust valve, and wherein the method comprises:

phase shifting control of the exhaust valves of the internal combustion engine; and controlling the fuel injection timing of the fuel injectors based on a current phase shift of the control of the exhaust valves.

9. The method according to claim 1, wherein the method comprises:

providing the estimate of a residual gas imbalance between the at least two cylinders.

10. The method according to claim 9, wherein providing the estimate of the residual gas imbalance between the at least two cylinders comprises:

obtaining temperature data representative of a temperature at a respective air inlet of the at least two cylinders; and providing the estimate based on the temperature data.

11. The method according to claim 9, wherein providing the estimate of the residual gas imbalance between the at least two cylinders comprises:

obtaining engine operation data representative of one or more of an engine speed, an engine load, and a current phase shift of the control of exhaust valves and/or inlet valves of the internal combustion engine; and providing the estimate based on the engine operation data.

12. A computer program product stored on a non-transitory computer-readable medium, said computer program product for controlling an internal combustion engine, the internal combustion engine comprising at least two cylinders, wherein each cylinder comprises at least one fuel injector configured to inject fuel into the cylinder, wherein said computer program product comprising computer instructions to cause one or more computer processors to perform the following operations:

controlling the fuel injection performed by the fuel injectors into the cylinders based on an estimate of a residual gas imbalance between the at least two cylinders, wherein said controlling the fuel injection performed by the fuel injectors comprises:

advancing a fuel injection timing of a fuel injector if the estimate of the residual gas imbalance between the at least two cylinders exceeds a threshold amount of residual gas in the cylinder comprising the fuel injector; and retarding the fuel injection timing of the fuel injector if the estimate of the residual gas imbalance between the at least two cylinders is less than a threshold amount of residual gas in the cylinder comprising the fuel injector.

13. A control arrangement for an internal combustion engine, the internal combustion engine comprising at least two cylinders, wherein each cylinder comprises at least one fuel injector configured to inject fuel into the cylinder, and wherein the control arrangement is configured to:

control the fuel injection performed by the fuel injectors based on an estimate of an imbalance between residual gas in the at least two cylinders, wherein said control of the fuel injection performed by the fuel injectors comprises:

advancing a fuel injection timing of a fuel injector if the estimate of the residual gas imbalance between the at least two cylinders exceeds a threshold amount of residual gas in the cylinder comprising the fuel injector; and retarding the fuel injection timing of the fuel injector if the estimate of the residual gas imbalance between the at least two cylinders is less than a threshold amount of residual gas in the cylinder comprising the fuel injector.

14. An internal combustion engine comprising at least two cylinders, wherein each cylinder at least one fuel injector configured to inject fuel into the cylinder, and wherein the internal combustion engine comprises a control arrangement configured to:

control the fuel injection performed by the fuel injectors based on an estimate of an imbalance between residual gas in the at least two cylinders, wherein said control of the fuel injection performed by the fuel injectors comprises:

advancing a fuel injection timing of a fuel injector if the estimate of the residual gas imbalance between the at least two cylinders exceeds a threshold amount of residual gas in the cylinder comprising the fuel injector; and retarding the fuel injection timing of the fuel injector if the estimate of the residual gas imbalance between the at least two cylinders is less than a threshold amount of residual gas in the cylinder comprising the fuel injector.

15. The internal combustion engine according to claim 14, wherein the internal combustion engine is a compression ignition engine.

16. A vehicle comprising an internal combustion engine comprising at least two cylinders, wherein each cylinder at least one fuel injector configured to inject fuel into the cylinder, and wherein the internal combustion engine comprises a control arrangement configured to:

control the fuel injection performed by the fuel injectors based on an estimate of an imbalance between residual gas in the at least two cylinders, wherein said control of the fuel injection performed by the fuel injectors comprises:

advancing a fuel injection timing of a fuel injector if the estimate of the residual gas imbalance between the at least two cylinders exceeds a threshold amount of residual gas in the cylinder comprising the fuel injector; and retarding the fuel injection timing of the fuel injector if the estimate of the residual gas imbalance between the at least two cylinders is less than a threshold amount of residual gas in the cylinder comprising the fuel injector.

* * * * *